United States Patent
Isoda (10) Patent No.: US 9,043,713 B2
(45) Date of Patent: May 26, 2015

(54) INFORMATION PROCESSING APPARATUS FOR DISPLAYING SCREEN INFORMATION ACQUIRED FROM AN OUTSIDE DEVICE IN A DESIGNATED COLOR

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 13/207,290

(22) Filed: Aug. 10, 2011

(65) Prior Publication Data

US 2012/0047452 A1 Feb. 23, 2012

(30) Foreign Application Priority Data

Aug. 18, 2010 (JP) ................................ 2010-183319

(51) Int. Cl.
*G06F 3/048* (2013.01)
*G06F 3/0484* (2013.01)
*G06F 17/30* (2006.01)
*G06F 17/21* (2006.01)
*G06F 9/44* (2006.01)

(52) U.S. Cl.
CPC ...... *G06F 3/04847* (2013.01); *G06F 17/30905* (2013.01); *G06F 17/211* (2013.01); *G06F 9/4443* (2013.01)

(58) Field of Classification Search
CPC ............ G06F 17/30905; G06F 17/211; G06F 17/2264; G06T 11/001; G09G 2340/06
USPC .......... 715/765, 204, 275, 200, 273; 345/581, 345/589–605, 619; 358/1.13–1.15
See application file for complete search history.

(56) References Cited

U.S. PATENT DOCUMENTS

| | | | |
|---|---|---|---|
| 7,522,296 B2 * | 4/2009 | Ozawa et al. ................ | 358/1.13 |
| 2006/0077423 A1 * | 4/2006 | Mathieson et al. .......... | 358/1.15 |
| 2010/0017502 A1 * | 1/2010 | Cheng et al. .................. | 709/219 |
| 2010/0134810 A1 * | 6/2010 | Shimamura et al. .......... | 358/1.9 |
| 2010/0174930 A1 * | 7/2010 | Kim et al. ..................... | 713/320 |

FOREIGN PATENT DOCUMENTS

| | | |
|---|---|---|
| JP | H11-065547 A | 3/1999 |
| JP | H11-073294 A | 3/1999 |
| JP | 2003-009031 A | 1/2003 |
| JP | 2004-029859 A | 1/2004 |
| JP | 2005-031983 A | 2/2005 |
| JP | 2006-127503 A | 5/2006 |
| JP | 2009-532956 A | 9/2009 |

OTHER PUBLICATIONS

Louis Lazaris, "Everything You Need to Know About !important CSS Declarations," Jun. 1, 2009, impressivewebs.com, pp. 1-15.*
Sakai et al., "Information barrier-free Technology", The Journal of the Institute of Image Information and, Jul. 1, 2010, vol. 64, No. 7, pp. 940-944.
Introduction to Windows API, the fourth, Inside Windows, Sep. 1998, vol. 9, pp. 83-91.

* cited by examiner

*Primary Examiner* — Kieu Vu
*Assistant Examiner* — Asteway T Gattew
(74) *Attorney, Agent, or Firm* — Canon U.S.A., Inc. IP Division

(57) ABSTRACT

An information processing apparatus configured to display a user interface on a display unit according to screen information acquired from an outside device changes the screen information according to a display attribute set by a user, and if setting of a display attribute of an object included in the screen information is unchangeable, color conversion processing of a specified object included in the screen information is performed and the screen information obtained by executing conversion processing according to the display attribute set by the user with respect to the screen information including the object which has undergone the color conversion processing is displayed.

10 Claims, 12 Drawing Sheets

```
<SCREEN 1>
    <OBJECT 1>                              SOLIDLY-SHADED
        <LOCATION> 200,100 </LOCATION>      BACKGROUND
        <SHAPE> RECTANGULAR </SHAPE>        OR FRAME
        <SIZE> 180,70 </SIZE>
        <COLOR> 138,23,2 </COLOR>
        <LAYER> 1 </LAYER>
    </OBJECT 1>
    <OBJECT 2>                              COLOR CHANGE
        <LOCATION> 210,110 </LOCATION>      PERMITTED
        <FILE> ../obj/element2.bmp </FILE>  IMAGE
        <LAYER> 2 </LAYER>
    </OBJECT 2>
    <OBJECT 3>                              COLOR CHANGE
        <LOCATION> 220,120 </LOCATION>      PROHIBITED
        <FILE> ../obj/element3.bmp </FILE>  IMAGE
        <COLOR CHANGE PERMISSION FLAG> CHANGE PROHIBITED </COLOR CHANGE PERMISSION FLAG>
        <LAYER> 3 </LAYER>
    </OBJECT 3>
</SCREEN 1>
```

INFORMATION PROCESSING APPARATUS FOR DISPLAYING SCREEN INFORMATION ACQUIRED FROM AN OUTSIDE DEVICE IN A DESIGNATED COLOR

This application claims priority from Japanese Patent Application No. 2010-183319 filed Aug. 18, 2010, which is hereby incorporated by reference herein in its entirety.

BACKGROUND OF THE INVENTION

1. Field of the Invention

The present invention relates to an information processing apparatus including a display unit used for displaying screen information acquired from an outside device, a display control method, and a storage medium.

2. Description of the Related Art

An operation screen provided by a web server application which runs on a web server is commonly displayed on an entire or a part of a display screen of an information processing apparatus, such as a personal computer (PC), connected to the web server on a network.

In this case, a web browser of the information processing apparatus requests the web server application that runs on the web server for information of the operation screen. According to the request from the information processing apparatus, the web server application transmits a Hypertext Markup Language (HTML) file to be used for generating the operation screen to the information processing apparatus. The web browser of the information processing apparatus analyzes the received HTML file, and generates the operation screen based on the description of the received HTML file.

Further, if the user inputs an instruction via the operation screen which has been generated by the web browser and displayed on the display screen, the content of the input is notified to the web server application by the web browser. When the web server application that runs on the web server receives the notification, the web server application executes processing according to the content of the information.

Nowadays, some information processing apparatus including a scanner or a printer further includes a web browser. Such information processing apparatus displays an operation screen provided by a web server application on a display screen of the information processing apparatus by the procedure described above, and accepts various types of instructions given by the user.

Further, a different technique is discussed in Japanese Patent Application Laid-Open No. 2006-127503. According to the technique discussed in Japanese Patent Application Laid-Open No. 2006-127503, a web server application provides an operation screen of a display screen to be used for inputting an instruction for utilizing each function of the information processing apparatus.

In other words, the user of the information processing apparatus inputs an instruction for the information processing apparatus via the operation screen of the display screen. Then, the instruction which has been input is notified to the web server application by the web browser of the information processing apparatus. The web server application that has received the notification requests the information processing apparatus to execute the processing according to the content of the instruction input by the user. Then, the information processing apparatus that has received the request executes the processing that has been requested.

This eliminates the need for storing all the operation screen information used for the operation of the information processing apparatus in the information processing apparatus, and the operation screen can be easily changed via the web server application.

Nowadays, display screens that consider users with impaired vision are being discussed. For example, Japanese Patent Application Laid-Open No. 2003-009031 discusses a display device of an information processing apparatus which performs color conversion of the entire display screen according to a predetermined method, and displays the result of the conversion on the display screen. The color conversion is, for example, color reversal.

Further, some of the information processing apparatuses allow the user to register an object whose color is to be converted and the color conversion method in advance. If an information processing apparatus having the configuration discussed in Japanese Patent Application Laid-Open No. 2006-127503 performs the color conversion of the display screen as discussed in Japanese Patent Application Laid-Open No. 2003-009031, all the objects included in the received HTML file will be converted.

For example, the color of the whole display screen including the operation screen will be reversed. However, color change of some of the objects included in the HTML file is not permitted. For example, any color change of a corporate logo is not permitted from the viewpoint of copyright management. Further, there are objects whose convenience is reduced if the color conversion is performed. These objects include color adjustment tables and tables using different shades of gray. Further, the true meaning of photographs and pictures are lost when the colors are converted.

On the other hand, the HTML files stored by the web server application may be updated when the use method is changed. The HTML files are also changed for convenience reasons or when new functions are added. When a new object is formed according to the update, the newly added object may be an object whose modification is not permitted or whose convenience is reduced if color conversion is performed. Further, the true meaning of the object may be lost if the color conversion is performed.

However, the processing apparatus is unable to obtain information in advance about the display of the new object in the updated HTML file described above. Thus, the color of the object whose color conversion is not permitted or not to be permitted under normal conditions may be changed if the color conversion of all the objects is permitted according to the setting of the information processing apparatus.

SUMMARY OF THE INVENTION

The present invention is directed to an information processing apparatus and a display control method capable of displaying an object included in screen information acquired from an outside device in a designated color regardless of a color change order of the display screen.

According to an aspect of the present invention, an information processing apparatus configured to display a user interface on a display unit according to screen information acquired from an outside device includes a screen processing unit configured to change the screen information according to a display attribute set by a user, a determination unit configured to determine whether a display attribute of an object included in the screen information acquired from the outside device is set unchangeable, a conversion unit configured to, if the determination unit determines that a display attribute of an object is set unchangeable, perform color conversion processing of a specified object included in the screen information acquired from the outside device, and a control unit configured to display on the display unit screen information obtained by the screen processing unit executing conversion processing according to the display attribute set by the user with respect to the screen information including the object which has undergone the color conversion processing by the conversion unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
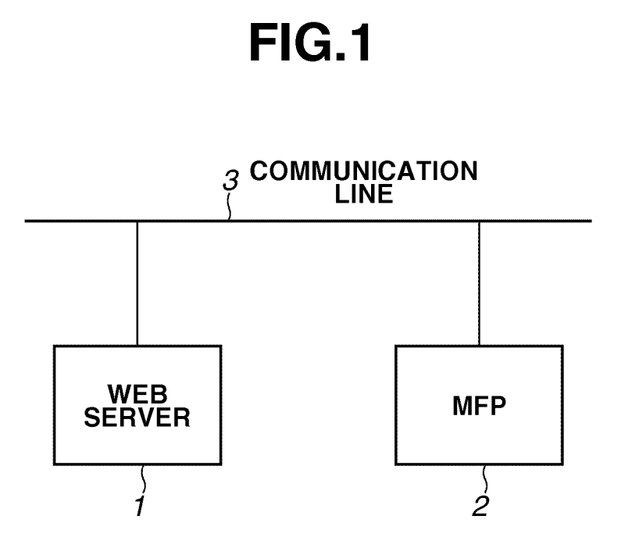
FIG. 1 illustrates a configuration of an information processing system.

FIG. 1 illustrates a configuration of an information processing system including an information processing apparatus according to a first exemplary embodiment of the present invention. The information processing apparatus is not limited to a multifunction peripheral (MFP) and can be a different type of information processing apparatus so long as it includes a display device that allows color display of a user interface.

According to the information processing system in FIG. 1, a web server 1 and a MFP 2 which is an example of the information processing apparatus are connected via a communication line 3. The web server 1 has functions required for a normal web server. Since the present invention is independent of the functions required for the web server 1, they are not described in the descriptions below.

Figure 2:
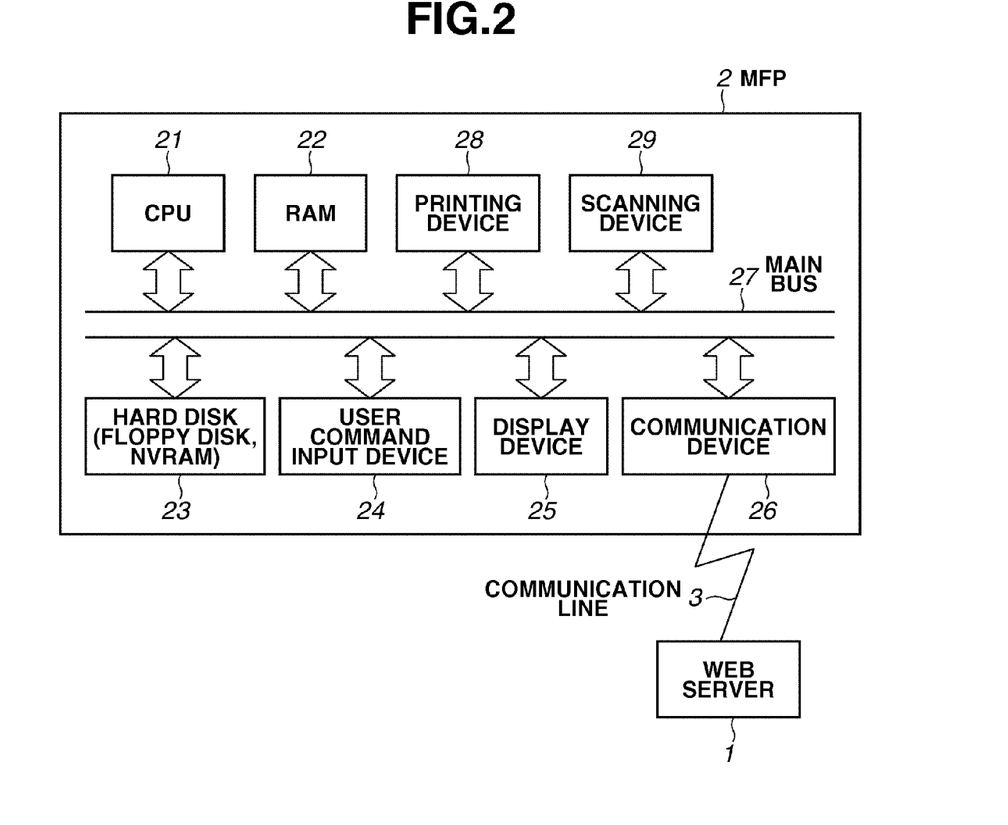
FIG. 2 is a block diagram illustrating a hardware configuration of an information processing apparatus.

FIG. 2 is a block diagram illustrating a hardware configuration of the MFP 2 illustrated in FIG. 1. In FIG. 2, a CPU 21 controls each device connected to a main bus 27. A RAM 22 provides a work area for the CPU 21.

A hard disk (HDD) 23 stores a program including a control procedure described in the flowchart below, various settings, and files. A non-volatile random access memory (NVRAM) or a solid state disk (SSD) can be used in place of the HDD 23.

A user command input device 24 is used when the user makes various settings via a graphic user interface (GUI). A display device (display unit) 25 displays the GUI. A communication device 26 communicates with the web server 1. A printing device 28 performs printing. A scanning device 29 scans, for example, a document.

Unless otherwise specified, according to the present exemplary embodiment, the CPU 21 of the MFP 2 controls the RAM 22, the HDD 23, the user command input device 24, the display device 25, the communication device 26, the printing device 28, and the scanning device 29 via the main bus 27.

Further, the program of the present invention includes a function of a web browser used for analyzing HTML files and generating a screen used for displaying the content of the HTML file. Unless otherwise specified, the HTML file is analyzed, and the screen is generated by a web browser function included in the program.

Figure 3:
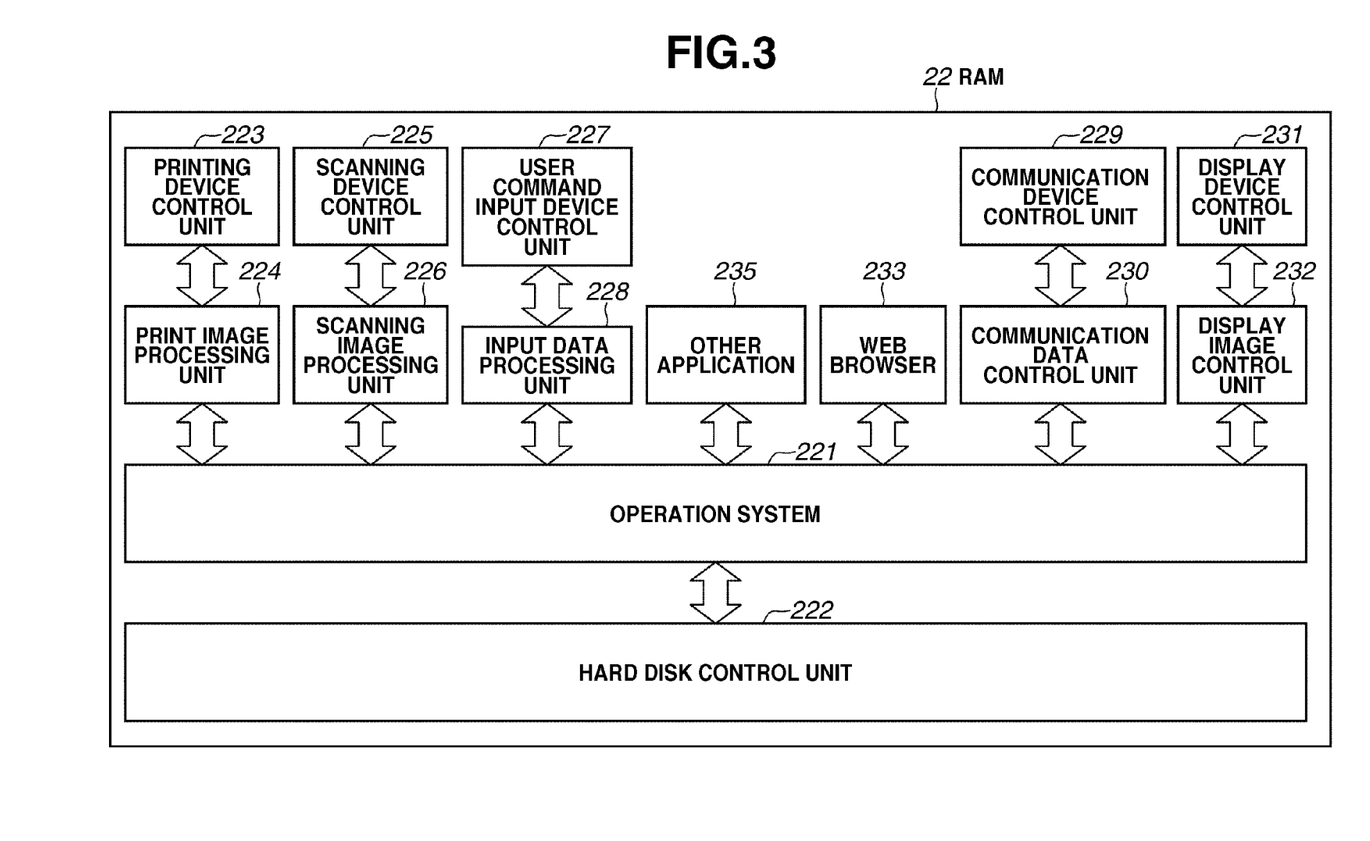
FIG. 3 illustrates an example of a software configuration.

FIG. 3 illustrates an example of a configuration of the software loaded onto the MFP 2 illustrated in FIG. 1. In FIG. 3, an operation system (OS) 221 controls the entire MFP 2. A hard disk control unit 222 controls the HDD 23. A printing device control unit 223 controls the printing device 28. A print image processing unit 224 processes a print image.

A scanning device control unit 225 controls the scanning device 29. A scanned image processing unit 226 processes a scanned image. A user command input device control unit 227 controls the user command input device 24. An input data processing unit 228 processes input data. A communication device control unit 229 controls the communication device 26. A communication data control unit 230 processes data which has been transmitted/received.

A display device control unit 231 controls the display device 25. A display image control unit 232 controls the image to be displayed. A web browser function unit (web browser) 233 processes the HTML file. Other applications 235 are applications other than the web browser.

The printing device control unit 223 and the print image processing unit 224, the scanning device control unit 225 and the scanned image processing unit 226, the communication device control unit 229 and the communication data control unit 230, and the display device control unit 231 and the display image control unit 232 directly exchange data, respectively. Other units exchange data via an operation system (OS) 221 unless specifically specified.

Figure 4:
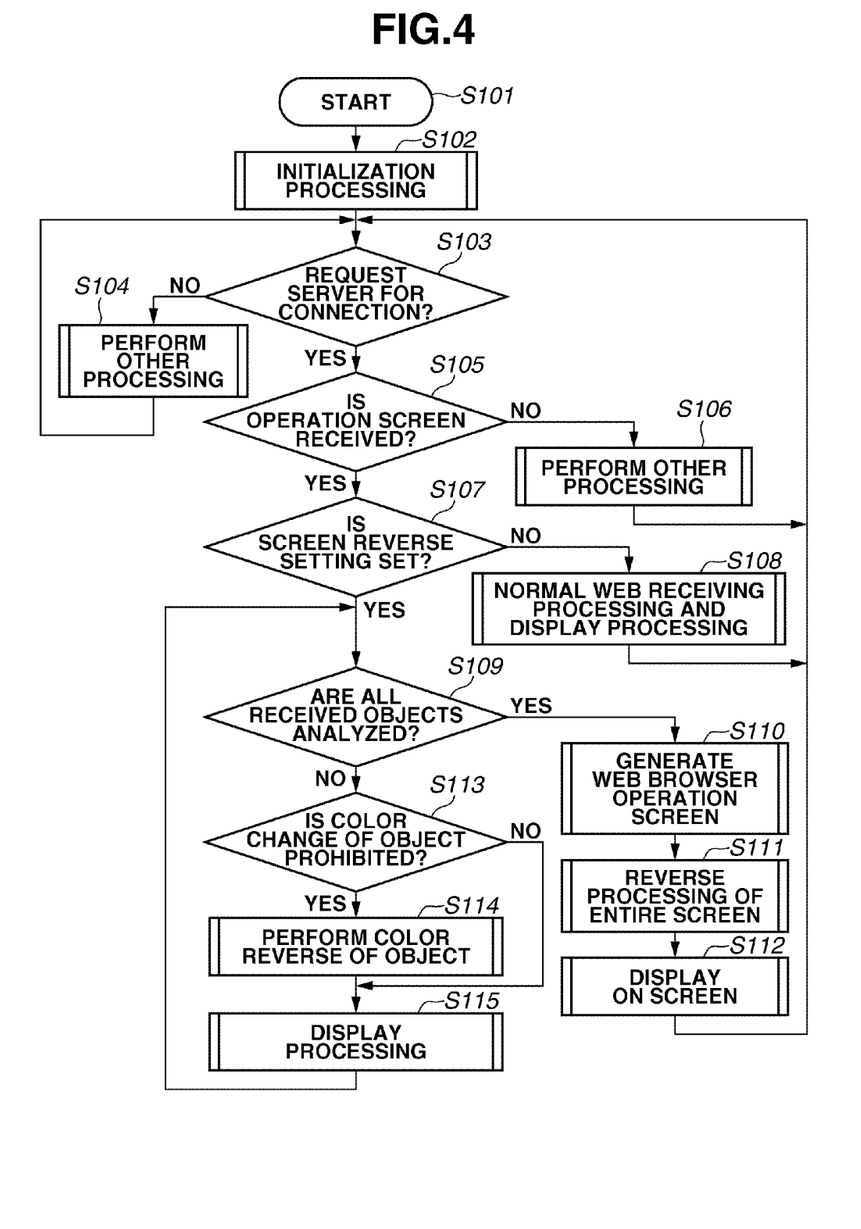
FIG. 4 is a flowchart illustrating a control procedure of the information processing apparatus.

FIG. 4 is a flowchart illustrating a control procedure of the information processing apparatus according to the present exemplary embodiment. According to the procedure, display of the display screen is controlled by the web browser of the information processing apparatus. Each step of the flowchart is realized by the CPU 21 loading the control program (software illustrated in FIG. 3) onto the RAM 22 and executing the program. Thus, the software illustrated in FIG. 3 is mainly described in the description below.

Further, according to the present exemplary embodiment, the MFP 2 can make color reverse settings regarding "color reverse/non-reverse" of the screen to be displayed on the display device 25, and further store the settings in the HDD 23 via the hard disk control unit 222.

Further, the display device 25 includes a screen reverse function. According to an instruction sent from the display device control unit 231, the color of the whole display screen is reversed and displayed by the display device 25. In step S102, when power is supplied to the MFP 2, the OS 221 starts the MFP 2 and the entire system is initialized. When the initialization is completed, the OS 221 waits for an input from the user command input device 24.

In step S103, the OS 221 determines whether the content of the input in the input data processing unit 228 is a request for a connection to the web server 1. If the OS 221 determines that the content is not such a request (NO in step S103), the processing proceeds to step S104. In step S104, the OS 221 performs processing according to the content of the input, and then the processing returns to step S103.

On the other hand, in step S103, if the OS 221 determines that the content of the input is a request for a connection to the web server 1 (YES in step S103), the processing proceeds to step S105. In step S105, the web browser 233 is connected to the web server 1 via the communication data control unit 230, the communication device control unit 229, and the communication device 26. Then, the communication device control unit 229 waits until a HTML file including the operation screen information is transmitted from the web server 1 via the communication device 26, and determines whether the HTML file has been received.

If the communication device control unit 229 determines that data other than the HTML file of the operation screen is received (NO in step S105), then the processing proceeds to step S106. In step S106, processing corresponding to the received data is performed by one of other applications corresponding to the processing. The processing by other applications includes processing performed by the print image processing unit 224.

On the other hand, in step S105, if the HTML file of the operation screen sent from the web server 1 is received by the communication device control unit 229 (YES in step S105), the processing proceeds to step S107. In step S107, the web browser 233 determines whether the screen reverse setting is set. If the web browser 233 determines that the screen reverse setting is not set (NO in step S107), the processing proceeds to step S108.

In step S108, the web browser 233 performs the receiving processing of the normal operation screen of the HTML file, and generates the operation screen. Then, the display image control unit 232 displays the display screen including the operation screen on the display device 15.

Figure 5:
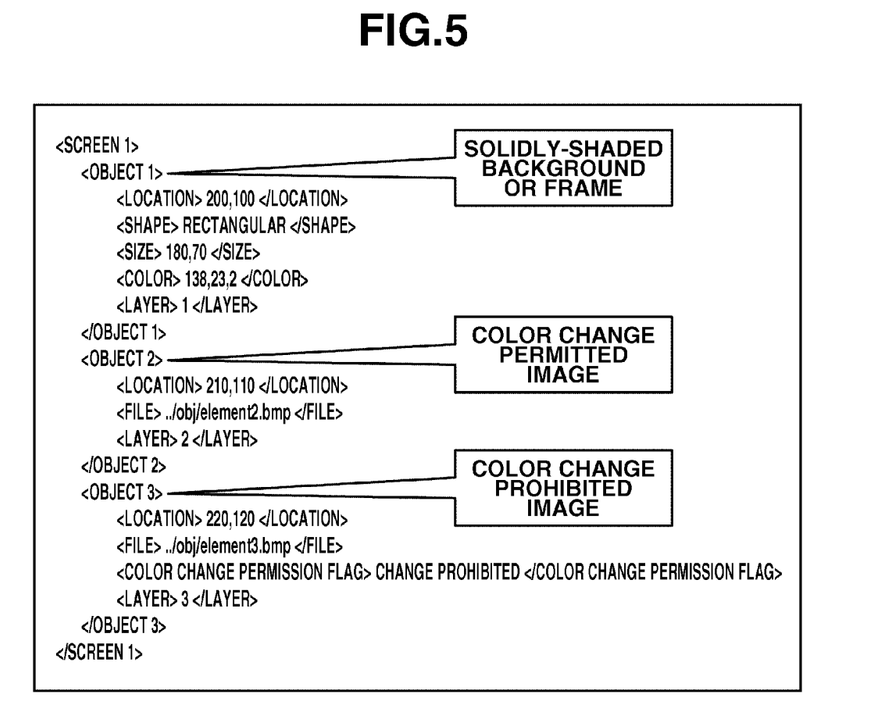
FIG. 5 illustrates an example of screen data acquired from a web server.

On the other hand, in step S107, if the web browser 233 determines that the screen reverse setting is set (YES in step S107), the processing proceeds to step S109. In step S109, the web browser 233 analyzes the HTML file sent from the web server 1. FIG. 5 illustrates an example of the content of the received HTML file.

In FIG. 5, display attributes are set for the object displayed on the display device 25 and whether the object is an object whose display can be changed by the display device 25 can be determined according to the display attributes.

In other words, the web browser 233 can determine whether the change of the object to be displayed is prohibited by referring to the display attributes. In other words, a certain type of object, such as a corporate logo of a manufacturing corporation, can be designated by the web server screen that provides the screen information so that its color is not changed.

Referring back again to FIG. 4, in step S109, the web browser 233 determines whether analysis of all the objects included in the received HTML has been completed. If the web browser 233 determines that analysis of all the objects has been completed (YES in step S109), the processing proceeds to step S110. In step S110, according to the result of the analysis, the operation screen is generated. In step S111, the display device control unit 231 performs the color reverse processing of the whole display screen including the operation screen by the display device 15. In step S112, the obtained result is displayed on the display device 15, and then the processing returns to step S103.

In step S111, since the color of the object, such as a logo, whose color change is prohibited, is already reversed, the logo will be displayed in its original color according to the execution of the reverse processing in step S111.

On the other hand, in step S109, if the web browser 233 determines that analysis of all the objects has not been completed yet (NO in step S109), the processing proceeds to step S113. In step S113, the web browser 233 determines whether the color change of the next object is prohibited according to whether a color change prohibition flag is set.

If the web browser 233 determines that the color change of the object is prohibited (YES in step S113), the processing proceeds to step S114. In step S114, the web browser 233 performs the color reverse processing of the object. In step S115, the web browser 233 displays the result of the color reverse. Then, the processing returns to step S109.

Since the change of the display attribute set by the user is performed in step S111, the color of the object is reversed (i.e., color conversion processing is performed) in advance in step S114. Thus, the object is displayed in a state where the color of the specific object is not reversed by the reverse processing, in other words, the object is displayed in its original color.

On the other hand, in step S113, if the web browser 233 determines that the color change of the next object is not prohibited according to the color change prohibition flag (NO in step S113), the processing proceeds to step S115. In step S115, the web browser 233 performs the display processing of the object. Then, the processing returns to step S109.

Figure 6A:
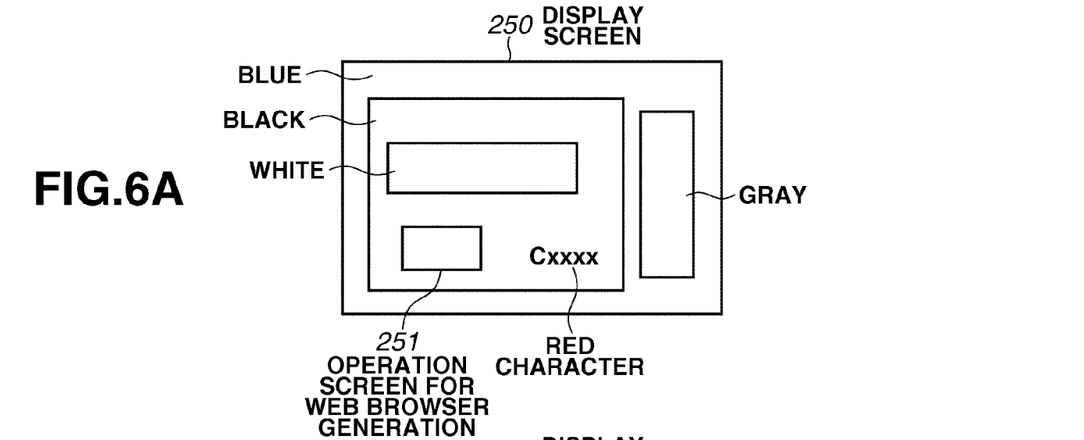
FIGS. 6A, 6B, and 6C illustrate an example of a display screen of the information processing apparatus according to a first exemplary embodiment of the present invention.
Figure 6B:
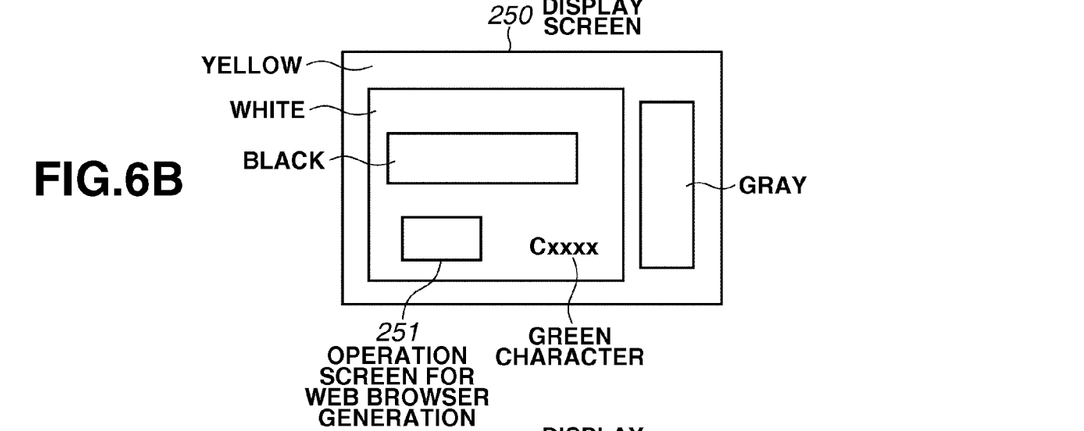
Figure 6C:
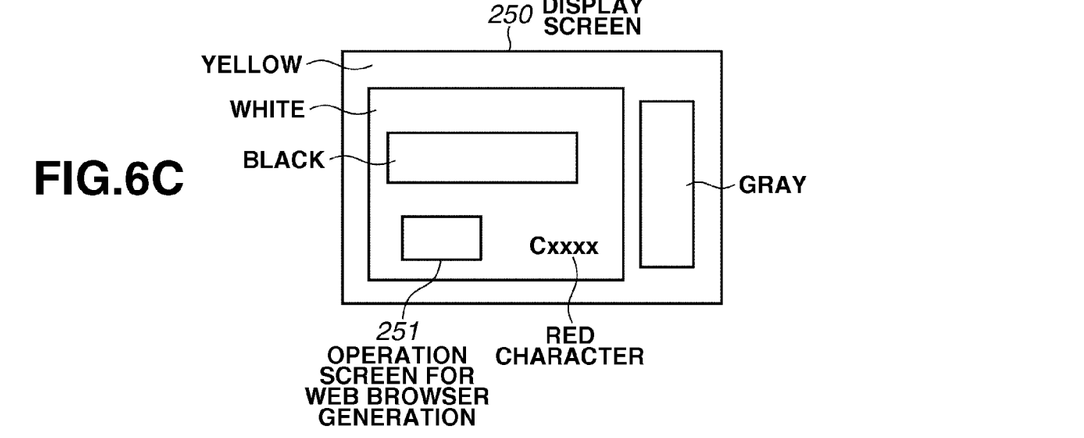

FIG. 6A illustrates an un-reversed screen. FIG. 6B illustrates a screen which is reversed without the application of the present invention. FIG. 6C illustrates a reversed screen with the application of the present invention. Various types of user interface of color can be displayed on a display screen 250 of the display device 25.

A registered trademark in FIGS. 6A to 6C is to be displayed in a red color. For example, the registered trademark includes characters "Cxxxx". Since "Cxxxx" is a corporate logo, change of its color is not permitted. If the present invention is not applied, the color of the characters "Cxxxx", which are to be displayed in red, will be reversed when the logo is displayed.

Figure 7:
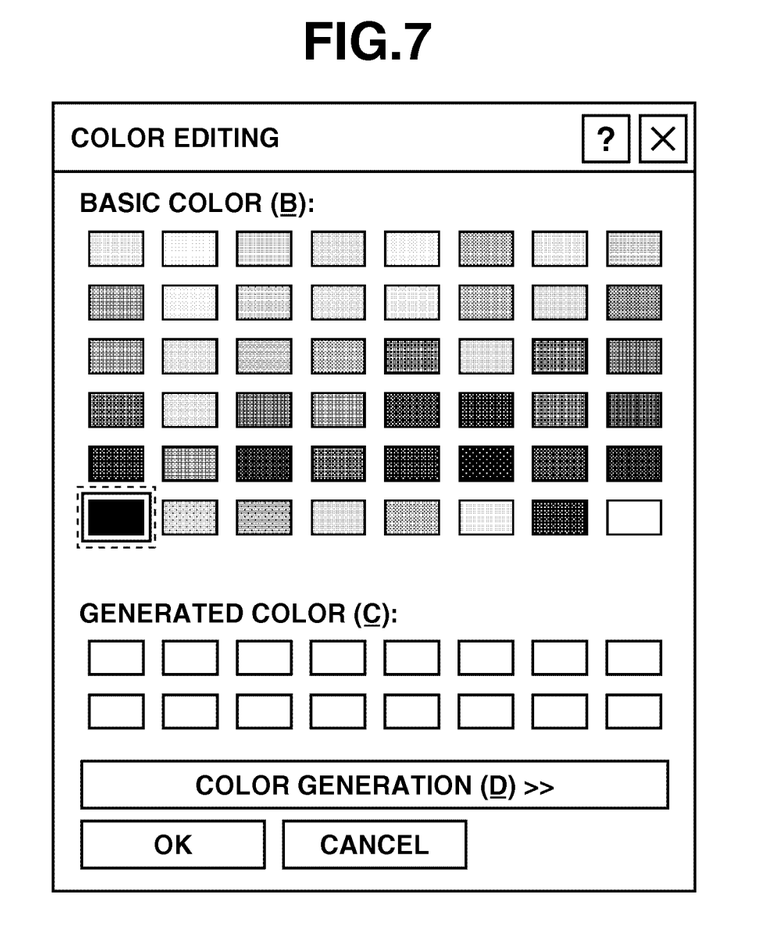
FIG. 7 illustrates an example of a color editing screen which can be displayed on a display device illustrated in FIG. 1.
Figure 8:
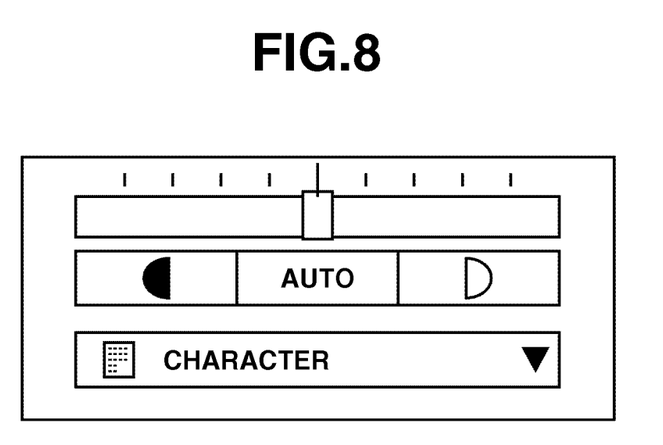
FIG. 8 illustrates an example of a screen which can be displayed on the display device illustrated in FIG. 1.

However, if the present invention is applied, the characters "Cxxxx", which are to be displayed in red, are displayed in the original color. Further, the present invention is also effective on objects other than the one described above. FIGS. 7 and 8 illustrate examples of such objects. FIG. 7 illustrates a color editing screen. By selecting a desired color therefrom, the user can change the color of a button or the like on the display to the selected color.

According to the present exemplary embodiment, the reverse display attribute is designated when the change of the display attribute set by the user is designated. However, the display attribute to be changed is not limited to the reverse display attribute.

According to a second exemplary embodiment of the present invention, since the system configuration as well as the hardware configuration and the software configuration of the MFP are similar to the configurations of the first exemplary embodiment, their descriptions are not repeated.

Figure 9:
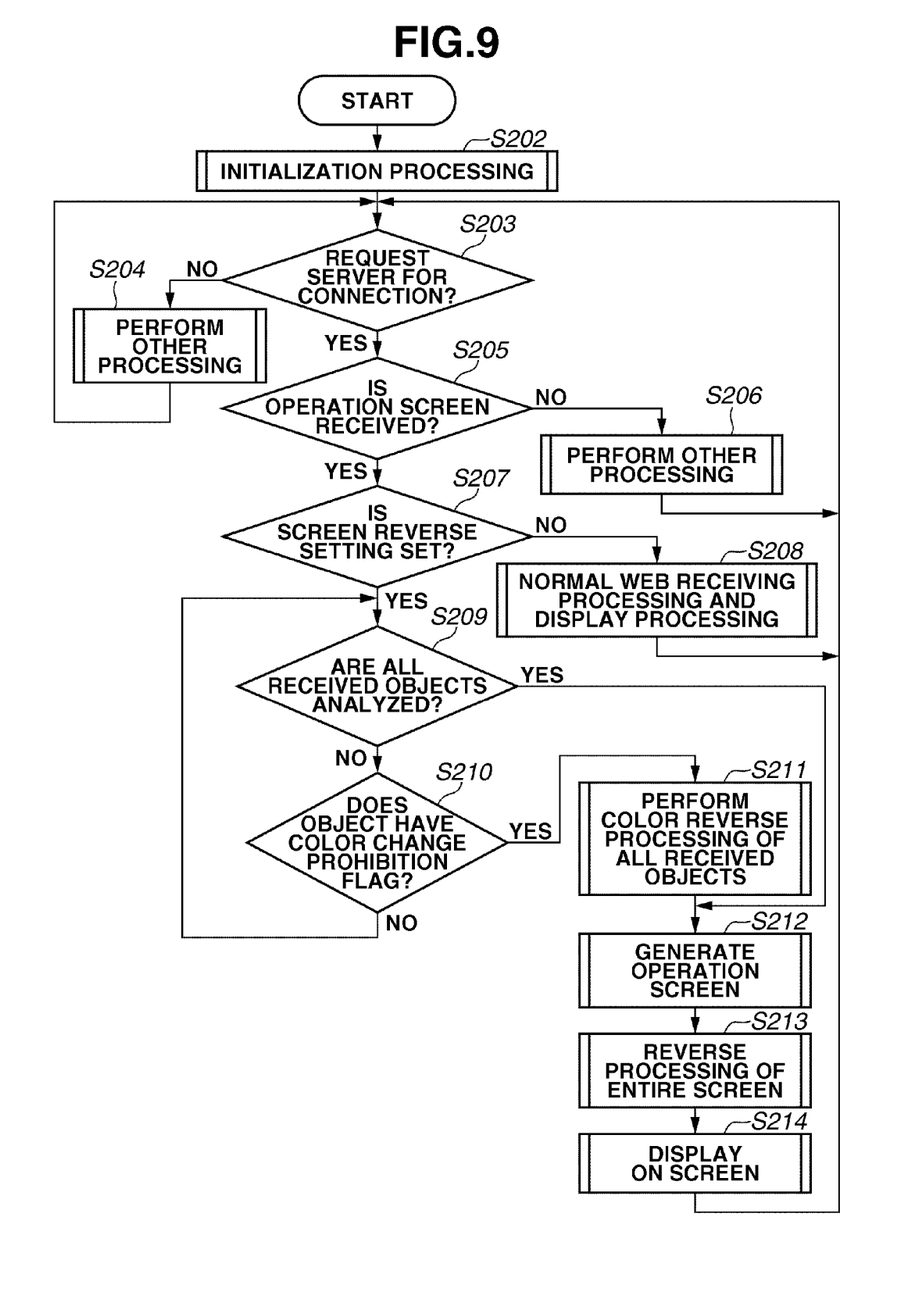
FIG. 9 is a flowchart illustrating a control procedure of the information processing apparatus.

FIG. 9 is a flowchart illustrating a control procedure of the information processing apparatus according to the present exemplary embodiment. According to the procedure, the display of the display screen is controlled by the web browser of the information processing apparatus. Each step of the flowchart is realized by the CPU 21 loading the control program (software illustrated in FIG. 3) onto the RAM 22 and executing the program. Thus, the software illustrated in FIG. 3 is mainly described in the description below.

Further, according to the present exemplary embodiment, the MFP 2 can make color reverse settings regarding "color reverse/non-reverse" of the screen displayed on the display device 25, and further store the settings in the HDD 23 via the hard disk control unit 222.

Further, the display device 25 includes a screen reverse function. According to an instruction sent from the display device control unit 231, the color of the whole display screen is reversed and displayed by the display device 25. In step S202, when power is supplied to the MFP 2, the OS 221 starts the MFP 2 and the entire system is initialized.

When the initialization is completed, the OS 221 waits for an input from the user command input device 24. In step S203, the input data processing unit 228 determines whether the content of the input is a request for a connection to the web server 1. If the input data processing unit 228 determines that the content is not such a request (NO in step S203), the processing proceeds to step S204. In step S204, processing according to the content of the input is performed, and then the processing returns to step S203.

On the other hand, in step S203, if the input data processing unit 228 determines that the content of the input is a request for a connection to the web server 1 (YES in step S203), the processing proceeds to step S205. In step S205, the web browser 233 is connected to the web server 1 via the communication data control unit 230, the communication device control unit 229, and the communication device 26. Then, the web browser 233 determines whether a HTML file including operation screen information transmitted from the web server 1 is received by the communication data control unit 230 via the communication device 26.

If the web browser 233 determines that data other than the HTML file of the operation screen has been received (NO in step S205), then the processing proceeds to step S206. In step S206, processing corresponding to the received data is performed by one of the applications corresponding to the processing. The other applications are similar to those described according to the first exemplary embodiment. Then, the processing returns to step S205.

On the other hand, in step S205, if the web browser 233 determines that the data of the HTML file of the operation screen has been received (YES in step S205), the processing proceeds to step S207. In step S207, if the HTML file of the operation screen has already been received, the web browser 233 determines whether the screen reverse setting is set. If the web browser 233 determines that the screen reverse setting is not set (NO in step S207), the processing proceeds to step S208.

In step S208, the web browser 233 performs the receiving processing of the normal operation screen of the HTML file and generates the operation screen. Then, the display image control unit 232 displays the display screen including the operation screen on the display device 15. Then, the processing returns to step S203.

On the other hand, in step S207, if the web browser 233 determines that the screen reverse setting is set (YES in step S207), the processing proceeds to step S209. In step S209, the web browser 233 analyzes the received HTML file. FIG. 5 illustrates an example of the content of the received HTML file.

Then, the web browser 233 determines whether the analysis of all the objects in the HTML file has been completed. If the web browser 233 determines that the analysis has been completed (YES in step S209), the processing proceeds to step S212. In step S212, the web browser 233 generates the operation screen according to the result of the analysis.

In step S213, the display device control unit 231 performs the color reverse processing of the whole display screen including the web browser operation screen by the display device 15. In step S214, the obtained result is displayed on the display device 15, and then the processing returns to step S203. Since all the objects which have been reversed in step S211 are reversed in step S213, the whole screen of the logo is displayed in its original color as a result of the processing.

On the other hand, in step S209, if the web browser 233 determines that analysis of all the objects has not been completed yet (NO in step S209), the processing proceeds to step S210. In step S210, the web browser 233 determines whether the color change of the next object is prohibited according to whether a color change prohibition flag is set.

If the web browser 233 determines that a color change prohibition flag is set for the next object (YES in step S210), the processing proceeds to step S211. In step S211, the web browser 233 performs the color reverse processing of all the objects in the received HTML file.

In step S212, the web browser 233 generates the operation screen, and the processing proceeds to step S213. Unlike the first exemplary embodiment, the processing procedure of the present exemplary embodiment includes the reverse processing in step S211. This step corresponds to the conversion processing which is performed so that the entire objects are reversed in advance of the reverse processing designated by the user of the objects displayed on the screen and executed in step S213.

Figure 10A:
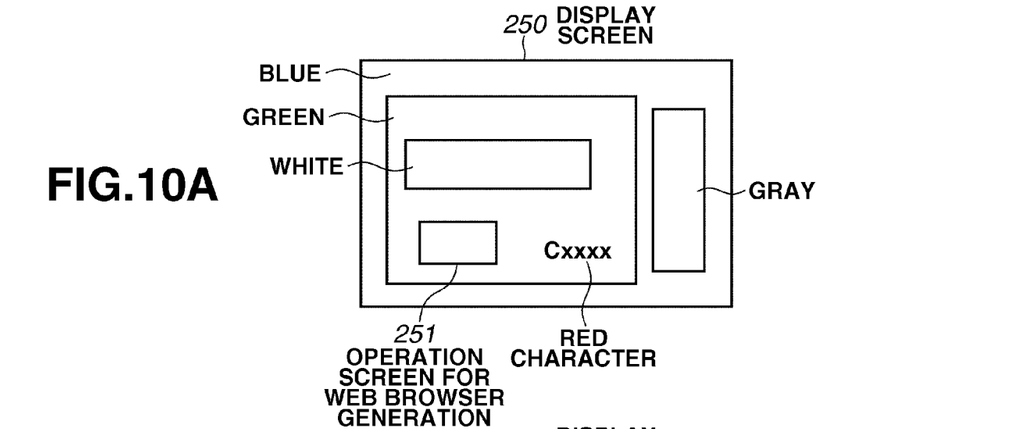
FIGS. 10A, 10B, and 10C illustrate an example of a display screen of the information processing apparatus according to a second exemplary embodiment of the present invention.
Figure 10B:
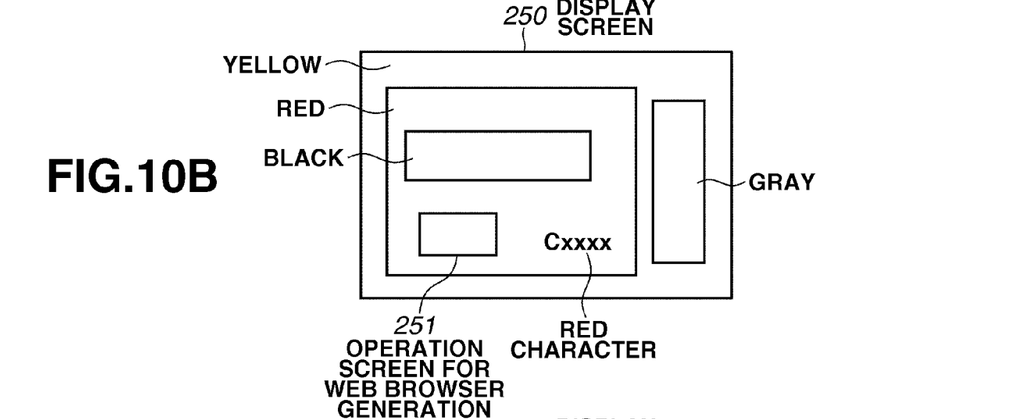

On the other hand, in step S210, if the web browser 233 determines that a color change prohibition flag is not set (NO in step S210), the processing returns to step S209. FIG. 10A illustrates an un-reversed screen according to the present exemplary embodiment. FIG. 10B illustrates a screen which is reversed according to the first exemplary embodiment.

Figure 10C:
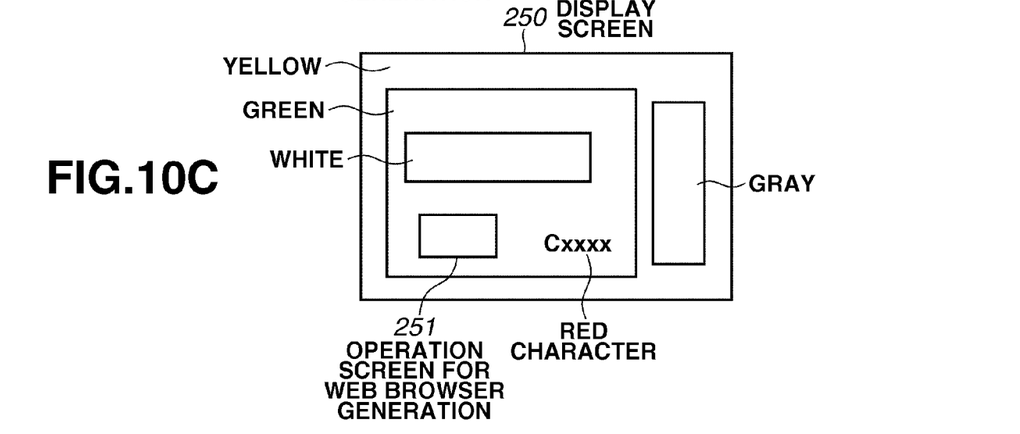

Further, FIG. 10C illustrates a reversed screen according to the present exemplary embodiment. Since "Cxxxx", which is to be displayed in red, is a corporate logo, change of its color is not permitted. If the first exemplary embodiment is applied to this case, although the characters of "Cxxxx" are displayed in red, since the background color of the characters of "Cxxxx" is reversed from green to red, the characters and the background have similar colors. Accordingly, the characters of "Cxxxx" are difficult to identify.

However, if the present exemplary embodiment is applied thereto, the characters of "Cxxxx" are displayed in their original color and the background of the characters of "Cxxxx" is also displayed in its original color. Accordingly, the characters of "Cxxxx" can be easily identified.

Further, in FIG. 10C, the region within the display screen 250 but outside of the operation screen 251 is reversed from "blue" in FIG. 10A to "yellow". In other words, according to the present exemplary embodiment, although the screen generated by the web browser is not reversed (original screen is maintained), regions other than such a region are reversed.

According to the present exemplary embodiment, although a reverse display attribute is designated with respect to the change order of the display attribute set by the user, the display attribute is not limited to such an example and thus not limited to a reverse display attribute.

According to the first and the second exemplary embodiments described above, display of a specific object or display of a specific screen is controlled in anticipation of the reverse processing set by the user of the information processing apparatus so that the object or the screen is displayed in its original color.

However, the information processing system may be configured so that processing of a specific object or object of the whole screen is performed according to the settings set by the user and the screen reverse processing is performed by the web server so that the information of the reversed screen can be acquired from the web server. Next, control processing used for acquiring reversed screen information from the web server and ultimately obtaining the original color screen display by executing reverse processing of the reversed screen information will be described.

According to a third exemplary embodiment of the present invention, since the system configuration as well as the hardware configuration and the software configuration of the MFP are similar to the configurations of the first exemplary embodiment, their descriptions are not repeated.

Figure 11:
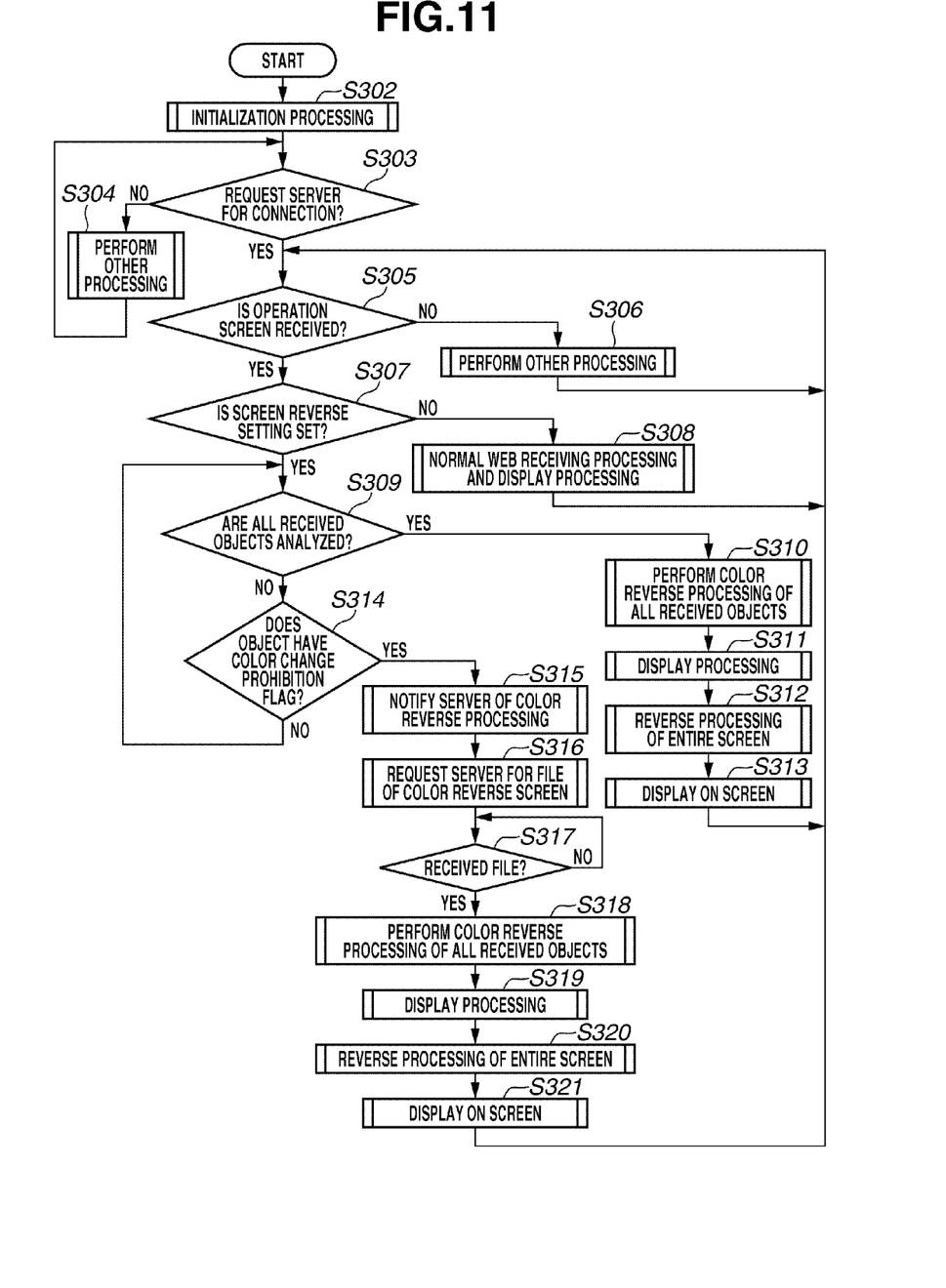
FIG. 11 is a flowchart illustrating a control procedure of the information processing apparatus.

FIG. 11 is a flowchart illustrating a control procedure of the information processing apparatus according to the present exemplary embodiment. According to the procedure, the display of the display screen is controlled by the web browser of the information processing apparatus. Each step of the flowchart is realized by the CPU 21 loading the control program (software illustrated in FIG. 3) onto the RAM 22 and executing the program. Thus, the software illustrated in FIG. 3 is mainly described in the description below.

Further, according to the present exemplary embodiment, the MFP 2 can make color reverse settings regarding "color reverse/non-reverse" of the screen displayed on the display device 25, and further store the settings in the HDD 23 via the hard disk control unit 222.

Further, the display device 25 includes a screen reverse function. According to an instruction sent from the display device control unit 231, the color of the whole display screen is reversed and displayed by the display device 25. Furthermore, the MFP 2 can make color reverse settings of the "color reverse/non-reverse" screen displayed on the display device 25 and further store the settings.

In step S302, when power is supplied to the MFP 2, the start processing of the MFP 2 is performed by the OS 221, and the whole system is initialized. When the initialization is completed, the OS 221 waits for an input from the user command input device 24. In step S303, the input data processing unit 228 determines whether the content of the input is a request for a connection to the web server 1.

If the input data processing unit 228 determines that the content is not a request for connection (NO in step S303), the processing proceeds to step S304. In step S304, processing according to the content of the input is performed, and then the processing returns to step S303. On the other hand, in step S303, if the input data processing unit 228 determines that the content of the input is a request for a connection to the web server 1 (YES in step S303), the processing proceeds to step S305.

In step S305, the web browser 233 is connected to the web server 1 via the communication data control unit 230, the communication device control unit 229, and the communication device 26. Then, in step S305, the web browser 233 determines whether a HTML file including the operation screen is transmitted from the web server 1 via the communication device 26.

If the web browser 233 determines that operation screen data other than the HTML file has been received (NO in step S305), then the processing proceeds to step S306. Instep S306, processing corresponding to the received data is performed by one of other applications. The other applications are similar to the applications described according to the first exemplary embodiment. Then, the processing returns to step S305.

On the other hand, in step S305, if the web browser 233 determines that the data of the HTML file of the operation screen has been received (YES in step S305), the processing proceeds to step S307. In step S307, the web browser 233 determines whether the screen reverse setting is set. If the web browser 233 determines that the screen reverse setting is not set (NO instep S307), the processing proceeds to step S308.

In step S308, the web browser 233 performs the receiving processing of the normal operation screen of the HTML file, and generates the operation screen. Then, the display image control unit 232 displays the display screen including the web browser operation screen on the display device 15. Then, the processing returns to step S305.

On the other hand, in step S307, if the web browser 233 determines that the screen reverse setting is set (YES in step S307), the processing proceeds to step S309. In step S309, the web browser 233 analyzes the received HTML file. FIG. 5 illustrates an example of the content of the received HTML file.

Then, the web browser 233 determines whether the analysis of all the objects in the HTML file has been completed. If the web browser 233 determines that the analysis of all the objects in the HTML file has been completed (YES in step S309), the processing proceeds to step S310.

In step S310, the web browser 233 generates the operation screen according to the result obtained by analyzing the HTML file. In step S311, the display image control unit 232 generates the display screen including the operation screen by the display device 15. In step S312, according to the instruction given by the display image control unit 232, the color reverse processing of the whole screen including the operation screen is performed by the display device 15. In step S313, the display device 15 displays the result of the color reverse processing, and then the processing returns to step S305.

On the other hand, in step S309, if the web browser 233 determines that analysis of all the objects has not been completed yet (NO in step S309), the processing proceeds to step S314. In step S314, the web browser 233 determines whether the color change of the next object is prohibited according to whether a color change prohibition flag is set.

If the web browser 233 determines that the color change prohibition flag is set (YES in step S314), the processing proceeds to step S315. In step S315, the communication data control unit 230 notifies the web server 1 of the color reverse processing via the communication device 26 and the communication line 3. In step S316, the web browser 233 sends a request to the web server 1 for a HTML file of a screen corresponding to the color reverse via the communication data control unit 230, the communication device 26, and the communication line 3.

In step S317, the communication data control unit 230 determines whether a HTML file of a color-reversed corresponding screen has been sent from the web server 1 via the communication device 26 and the communication line 3. If the web browser 233 determines that a HTML file of a color-reversed corresponding screen has been sent from the web server 1 (YES in step S317), then the processing proceeds to step S318.

In step S318, the web browser 233 performs the color reverse processing of all the objects in the received HTML file. In step S319, the web browser 233 generates the operation screen according to the result of the color reverse processing.

In step S320, according to the instruction given by the display image control unit 232, the display device 15 performs the color reverse processing of the whole screen including the operation screen. In step S321, the result is displayed on the display device 15, and then the processing returns to step S305.

When the web server 1 receives the request for a HTML file of the screen corresponding to the color reverse from the MFP 2 via the communication line 3, the web server 1 sends a HTML file of the screen which is stored in the web server 1 and has gone under the color reverse processing to the MFP 2 via the communication line 3.

Figure 12A:
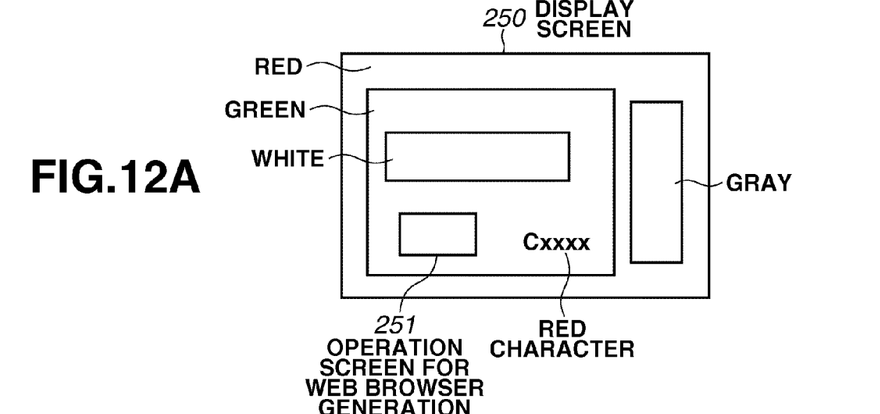
FIGS. 12A, 12B, and 12C illustrate an example of a display screen of the information processing apparatus according to a third exemplary embodiment of the present invention.
Figure 12B:
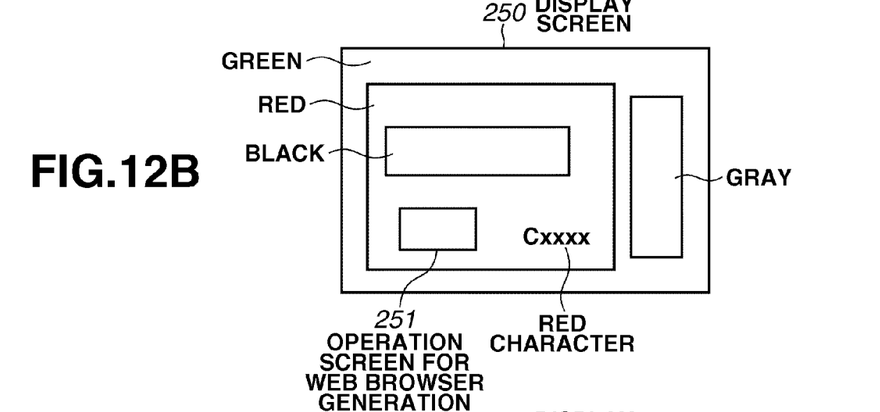
Figure 12C:
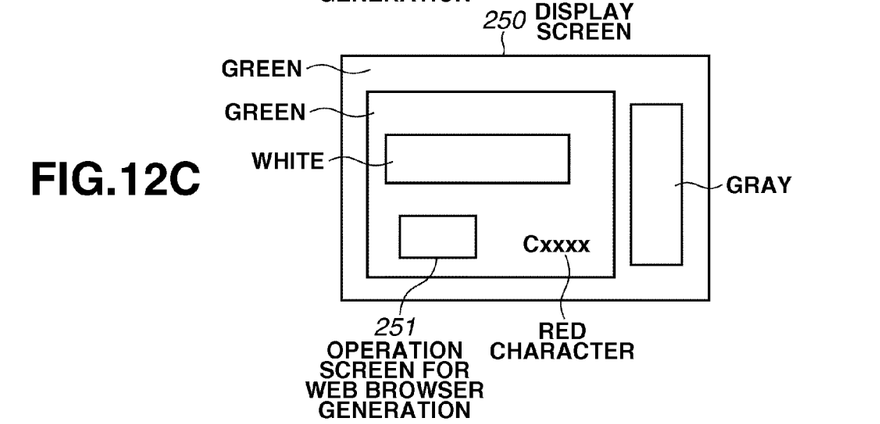

FIG. 12A illustrates an un-reversed screen according to the present exemplary embodiment. FIG. 12B illustrates a screen which is reversed according to the first exemplary embodiment. Further, FIG. 12C illustrates a reversed screen according to the present exemplary embodiment.

Since "Cxxxx", which is to be displayed in red, is a corporate logo, change of its color is not permitted. If the first exemplary embodiment is applied to this case, although the characters of "Cxxxx" are displayed in red, since the background color of the characters of "Cxxxx" is reversed from green to red, the characters and the background have similar colors. Accordingly, the characters of "Cxxxx" are difficult to identify.

However, if the present exemplary embodiment is applied thereto, the characters of "Cxxxx" are displayed in their original color and the background of the characters of "Cxxxx" will be also displayed in its original color. Accordingly, the characters of "Cxxxx" can be easily identified.

A creator of a new web browser of the existing MFP can obtain the information of the color reverse of the MFP before performing the generation. In other words, the creator can obtain information of the color of the browser operation screen, the background color of the operation screen, information of whether an object whose color reverse is prohibited is included, and if such an object is included, the color of the object. Thus, according to the present exemplary embodiment, a HTML file which is generated in anticipation of the color reverse can be acquired.

According to the above-described exemplary embodiment, a registered trademark or a corporate logo is used as an example of the object whose change of the color display attribute is prohibited. However, the object is not limited to such an example, and an object that should not be changed on the display screen can be used as the object of the present invention.

According to each exemplary embodiment of the present invention, the web server application can clearly notify the web browser of the information processing apparatus that color conversion of the object whose color conversion is not permitted whatsoever in the content of the HTML file is not permitted.

Thus, even if the settings such as "the color of the whole display screen is to be converted" is set by the information processing apparatus or if there is no information in advance, the object whose color conversion is not permitted is displayed on the operation screen of the display screen without any kind of color change. Accordingly, the object whose color conversion is not permitted or whose color conversion is not to be performed can be displayed as it is on the operation screen.

As a result, even if a new HTML file including a new object whose color conversion is not permitted or whose color is not to be converted is generated, the information processing apparatus can display the object as it is on the operation screen of the display screen without obtaining information of the new object in advance.

Thus, when a HTML file of a new operation screen is generated for the information processing apparatus, design limit regarding a new object whose color conversion is not permitted or whose color conversion is not to be performed can be reduced.

Since the operation screen for the information processing apparatus can be generated without changing the information processing apparatus, an operation screen which is more convenient can be provided from the web server application. Thus the merit of the configuration of the information processing system allowing transmission of the operation screen from the web server application to the information processing apparatus is fully utilized.

According to the present exemplary embodiment, a case where the reverse display attribute is designated in the change order of the display attribute set by the user is described. However, the display attribute of the present invention is not limited to the reverse display attribute.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus, comprising:
a memory;
a processor coupled to the memory which executes the following:
receiving user interface information provided by an external server, the user interface information including at least a first object to which a predetermined attribute is added and a second object to which the predetermined attribute is not added;
determining by a web browser whether a screen reverse setting is set;
performing, on the user interface information, a first color conversion processing in which a color of the first object is converted, but a color of the second object is not converted, when the web browser determines that the screen reverse setting is set and analysis of all received objects has not been completed;
performing, on the user interface information, a second color conversion processing in which colors of both of the first object and the second object are converted, after the first color conversion processing is performed, when the web browser determines that analysis of all received objects has been completed; and
displaying a user interface based on the user interface information including the first object and the second object to which the second color conversion processing is performed.

2. The information processing apparatus according to claim 1, wherein the external server is a Web server and the displaying includes a Web browser function.

3. The information processing apparatus according to claim 1, wherein the predetermined attribute indicates that changing a color of an object is not allowed.

4. An information processing apparatus, comprising:
a memory;
a processor coupled to the memory which executes the following:
receiving user interface information provided by an external server, the user interface information including at least a first object to which a predetermined attribute is added and a second object to which the predetermined attribute is not added;
determining by a web browser whether a screen reverse setting is set;
performing a color conversion processing in which a color of at least one of the first object and the second object is converted, when the web browser determines that the screen reverse setting is set and analysis of all received objects has been completed; and
displaying a user interface based on the user interface information including the first object and the second object to which the color conversion processing is performed,
wherein the color conversion processing to the first object included in the user interface information is performed two times, and the color conversion processing to the second object included in the user interface information is performed one time.

5. The information processing apparatus according to claim 4, wherein the external server is a Web server and the displaying includes a Web browser function.

6. The information processing apparatus according to claim 4, wherein the predetermined attribute indicates that changing a color of an object is not allowed.

7. A control method for an information processing apparatus, comprising:
receiving user interface information provided by an external server, the user interface information including at least a first object to which a predetermined attribute is added and a second object to which the predetermined attribute is not added;
determining by a web browser whether a screen reverse setting is set;
performing, on the user interface information, a first color conversion processing in which a color of the first object is converted, but a color of the second object is not converted, when the web browser determines that the screen reverse setting is set and analysis of all received objects has not been completed;
performing, on the user interface information, a second color conversion processing in which colors of both of the first object and the second object are converted, after the first color conversion processing is performed, when the web browser determines that analysis of all received objects has been completed; and
displaying a user interface based on the user interface information including the first object and the second object to which the second color conversion processing is performed.

8. A non-transitory computer-readable storage medium storing a program causing a computer to execute the control method according to claim 7.

9. A control method for an information processing apparatus, comprising:
receiving user interface information provided by an external server, the user interface information including at least a first object to which a predetermined attribute is added and a second object to which the predetermined attribute is not added; and
determining by a web browser whether a screen reverse setting is set;
performing a color conversion processing in which color of at least one of the first object and the second object is converted, when the web browser determines that the screen reverse setting is set and analysis of all received objects has been completed,
wherein, the color conversion processing to the first object included in the user interface information is performed two times, and the color conversion processing to the second object included in the user interface information is performed one time.

10. A non-transitory computer-readable storage medium storing a program causing a computer to execute the control method according to claim 9.

* * * * *